(12) United States Patent
Cai et al.

(10) Patent No.: US 10,850,810 B2
(45) Date of Patent: Dec. 1, 2020

(54) MARINE MONITORING BUOY WITH IMPROVED STRUCTURE

(71) Applicant: ZHEJIANG OCEAN UNIVERSITY, Zhoushan (CN)

(72) Inventors: Huiwen Cai, Zhoushan (CN); Tiejun Li, Zhoushan (CN); Yonghua Ren, Zhoushan (CN)

(*) Notice: Subject to any disclaimer, the term of this patent is extended or adjusted under 35 U.S.C. 154(b) by 0 days.

(21) Appl. No.: 16/699,016

(22) Filed: Nov. 28, 2019

(65) Prior Publication Data
US 2020/0172203 A1    Jun. 4, 2020

(51) Int. Cl.
*B63B 22/18* (2006.01)
*B63B 22/04* (2006.01)

(52) U.S. Cl.
CPC .............. *B63B 22/18* (2013.01); *B63B 22/04* (2013.01); *B63B 2209/20* (2013.01)

(58) Field of Classification Search
CPC ......... B63B 22/00; B63B 22/04; B63B 22/08; B63B 22/18; B63B 22/24; B63B 22/26; B63B 2209/20
USPC .......................................................... 441/1
See application file for complete search history.

(56) References Cited

U.S. PATENT DOCUMENTS

| | | | | |
|---|---|---|---|---|
| 4,896,620 A | * | 1/1990 | Jones | B63B 51/02 441/16 |
| 5,902,163 A | * | 5/1999 | Baruzzi | B63B 22/18 441/1 |
| 2010/0230965 A1 | * | 9/2010 | Pitre | F03B 13/14 290/42 |

* cited by examiner

*Primary Examiner* — Lars A Olson
(74) *Attorney, Agent, or Firm* — W&K IP

(57) ABSTRACT

A marine monitoring buoy with an improved structure belongs to the technical field of marine buoys. The marine monitoring buoy includes a first buoy body, a cylindrical portion and a conical portion. A vertical through hole is disposed in the first buoy body, a horizontal through hole is disposed in an upper part of the cylindrical portion, an upper end of the vertical through hole extends to the cylindrical portion and is in communication with the horizontal through hole, a lower end of the vertical through hole penetrates through the conical portion, a wind power generator is disposed in the vertical through hole, two guiding grooves are disposed on a side wall of a lower part of the vertical through hole, a metal piston rod is disposed in the vertical through hole.

8 Claims, 3 Drawing Sheets

MARINE MONITORING BUOY WITH IMPROVED STRUCTURE

CROSS-REFERENCE TO RELATED APPLICATIONS

This application claims priority to Chinese Patent Application No. 201811457952.0 with a filing date of Nov. 30, 2018. The content of the aforementioned application, including any intervening amendments thereto, are incorporated herein by reference.

TECHNICAL FIELD

The present disclosure belongs to the technical field of marine buoys, and relates to a marine monitoring buoy with an improved structure.

BACKGROUND

Marine environment is always changeable, for example, sometimes the wind is mild and the sun is bright, and the water is as flat as a mirror, and sometimes the wave rages and the sea roars like thunder.

To understand the sea and monitor the dynamics of the sea better, many marine monitoring buoys are usually disposed in the sea to monitor factors such as a wave height, a flowing direction of a sea current, and a temperature, a direction and an air pressure of seawater.

The marine monitoring buoy is generally small in volume, and is usually shaken badly in the marine environment with large stormy waves, thereby affecting normal operation of a monitoring device mounted on the marine monitoring buoy, and even resulting in a damage or a failure of the monitoring device mounted on the marine monitoring buoy.

In addition, since the marine monitoring buoy is generally far from the mainland, electrical energy used by the marine monitoring buoy is usually supplied by a solar panel disposed on the marine monitoring buoy. However, when the weather is continuously cloudy or rainy, the solar panel cannot generate power by using solar energy, and thus may result in insufficient electric power of the marine monitoring buoy, thereby affecting the normal operation of the marine monitoring buoy.

SUMMARY

To solve the above problems existing in the prior art, the present disclosure provides a marine monitoring buoy having good wind/wave resistance and generating power by using wave energy.

The object of the present disclosure may be achieved by the following technical solution: a marine monitoring buoy with an improved structure includes a first cylindrical buoy body, where a cylindrical portion and a conical portion are disposed on an upper side surface and a lower side surface of the first buoy body respectively, the cylindrical portion and the conical portion are both coaxially disposed with the first buoy body, a vertical through hole is coaxially disposed in the first buoy body, a horizontal through hole is disposed in an upper part of the cylindrical portion, an upper end of the vertical through hole extends to the cylindrical portion and is in communication with the horizontal through hole, a lower end of the vertical through hole penetrates through the conical portion, a wind power generator is disposed at the upper end of the vertical through hole through a first support frame, two guiding grooves are oppositely disposed on a side wall of a lower part of the vertical through hole, a metal piston rod is further inserted into the vertical through hole, the metal piston rod is in clearance fit with the vertical through hole, a piston is disposed at an upper end of the metal piston rod, sealing is provided between a side wall of the piston and a side wall of the vertical through hole, two sliding blocks are disposed on a side wall of the metal piston rod, the sliding blocks are in one-to-one correspondence with the guiding grooves and slidably disposed in corresponding guiding grooves, a spring is disposed in each of the two guiding grooves, a lower end of the spring is fixed to a lower end of the guiding groove, an upper end of the spring is fixedly connected on a lower side surface of the sliding block, a fixing ring is disposed at a lower end of the metal piston rod, the fixing ring is connected with an anchor through a positioning anchor chain, a battery cabin is further disposed inside the upper end of the cylindrical portion, a storage battery is disposed in the battery cabin, and the wind power generator is electrically connected with the storage battery.

In the above marine monitoring buoy with an improved structure, a circular flange is disposed on the side wall of the lower end of the metal piston rod, and a rubber layer is disposed at an upper side of the circular flange.

In the above marine monitoring buoy with an improved structure, a counterweight block is further disposed between the fixing ring and the positioning anchor chain.

In the above marine monitoring buoy with an improved structure, a mounting platform is further disposed at the upper end of the cylindrical portion, a fixing shaft is disposed on the mounting platform, a rotary cap is rotatably disposed on the fixing shaft, the rotary cap is fixedly connected with a counterweight ring through a support rod, the counterweight ring and the fixing shaft are coaxially disposed, and a plurality of blades are uniformly disposed at an outer circumference of the counterweight ring.

In the above marine monitoring buoy with an improved structure, a circular cavity is further disposed in the first buoy body, the circular cavity and the first buoy body are coaxially disposed, a plurality of power generating apparatuses for generating power by using wave energy are disposed in the circular cavity, and the power generating apparatus is electrically connected with the storage battery.

In the above marine monitoring buoy with an improved structure, a plurality of first square guiding holes are disposed at the bottom of the first buoy body, the plurality of first square guiding holes are in one-to-one correspondence with a plurality of power generating apparatuses, the first square guiding holes penetrate through the lower side surface of the first buoy body and the circular cavity, the power generating apparatus includes a second buoy body, a first movable rod and a second movable rod, the first movable rod has a square cross section and is slidably disposed in the first square guiding hole, the second buoy body is disposed at a lower end of the first movable rod, a metal plate and a guiding plate are vertically disposed on a side wall of the circular cavity through a second support frame, the guiding plate is located between the first movable rod and the metal plate, a piezoelectric material layer is disposed at both sides of the metal plate respectively, a second square guiding hole is horizontally opened on the guiding plate, the second movable rod has a square cross section and is slidably disposed in the second square guiding hole, a first roller and a second roller are rotatably disposed at both ends of the second movable rod respectively, a guiding block is vertically disposed on the first movable rod, the guiding block is located in the circular cavity, an arc surface is disposed at a side that is on the guiding block and opposite to the guiding plate, the first roller located on the second movable rod is always in contact with the piezoelectric material layer on the metal plate, the second roller is always in contact with the arc surface, and the piezoelectric material layer is electrically connected with the storage battery.

In the above marine monitoring buoy with an improved structure, an upper limiting ring and a lower limiting ring are further disposed on the first movable rod, sizes of the upper limiting ring and the lower limiting ring are both larger than that of the first square guiding hole and the upper limiting ring and the lower limiting ring are located at upper and lower sides of the first square guiding hole respectively, the power generating apparatus further includes a resetting spring, the resetting spring is sleeved on the first movable rod, an upper end of the resetting spring is pressed against the lower side surface of the first buoy body, and a lower end of the resetting spring is pressed against the lower limiting ring.

In the above marine monitoring buoy with an improved structure, the power generating apparatus further includes a limiting column, the limiting column is horizontally disposed on the side wall of the circular cavity, an end of the limiting column and an end of the second movable rod are oppositely disposed, the limiting column and the second movable rod are located at both sides of the metal plate respectively, and a buffering spring is disposed between the limiting column and the piezoelectric material layer on the metal plate.

In the above marine monitoring buoy with an improved structure, a plurality of warning lights are disposed on the mounting platform, and the warning light is electrically connected with the storage battery.

In the above marine monitoring buoy with an improved structure, the piezoelectric material layer is made of piezoelectric ceramic or piezoelectric crystal.

Compared with the prior art, the present disclosure has the following advantages.

1. The present marine monitoring buoy may automatically adjust a position of a gravity center, thereby improving the wind/wave resistance of the present marine monitoring buoy.

2. In a case that the stability of the present marine monitoring buoy is improved, electric energy can also be generated by using the wave energy and then stored in the storage battery. The storage battery supplies the electric energy to an electric device mounted on the present marine monitoring buoy.

Numerals of the drawings are described as follows: 1—a first buoy body, 1a—a vertical through hole; 1a1—a guiding groove, 1b—a circular cavity, 1c—a first square guiding hole, 2—a cylindrical portion, 2a—a horizontal through hole, 2b—a battery cabin, 3—a mounting platform, 4—a conical portion, 5—a counterweight block, 6—a positioning anchor chain, 7—an anchor, 8—a storage battery, 9—a warning light, 10—wind power generator, 10a—a first support frame, 11—a piston, 12—a metal piston rod, 12a—a sliding block, 12b—a rubber layer, 12c—a circular flange, 12d—a fixing ring, 13—a spring, 14—a fixing shaft, 15—a rotary cap, 16—a counterweight ring, 17—a support rod, 18—a blade, 19—a second buoy body, 20—a first movable rod, 20a—a lower limiting ring, 20b—an upper limiting ring, 21—a resetting spring, 22—a guiding block, 23—an arc surface, 24—a metal plate, 25—a piezoelectric material layer, 26—a limiting column, 27—a buffering spring; 28 is a second support frame, 29—a second movable rod, 30—a first roller, 30a—a second roller, 31—a guiding plate, and 31a—a second square guiding hole.

DETAILED DESCRIPTION OF THE EMBODIMENTS

The technical solution of the present disclosure is further described below in combination with specific examples of the present disclosure and the accompanying drawings, but the present disclosure is not limited to these examples.

Figure 1:
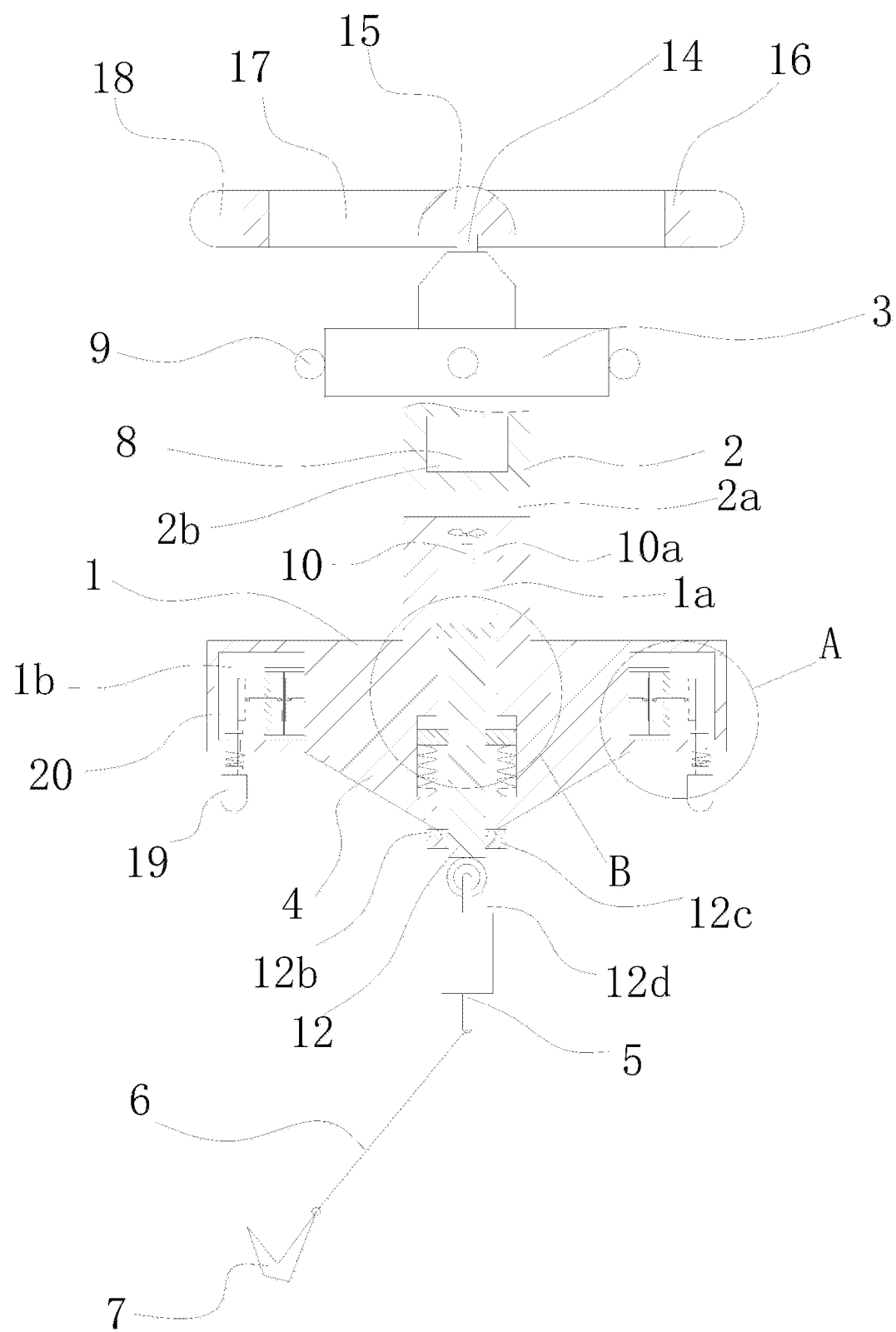
FIG. 1 is a schematic diagram illustrating a structure of a marine monitoring buoy according to an example of the present disclosure.
Figure 2:
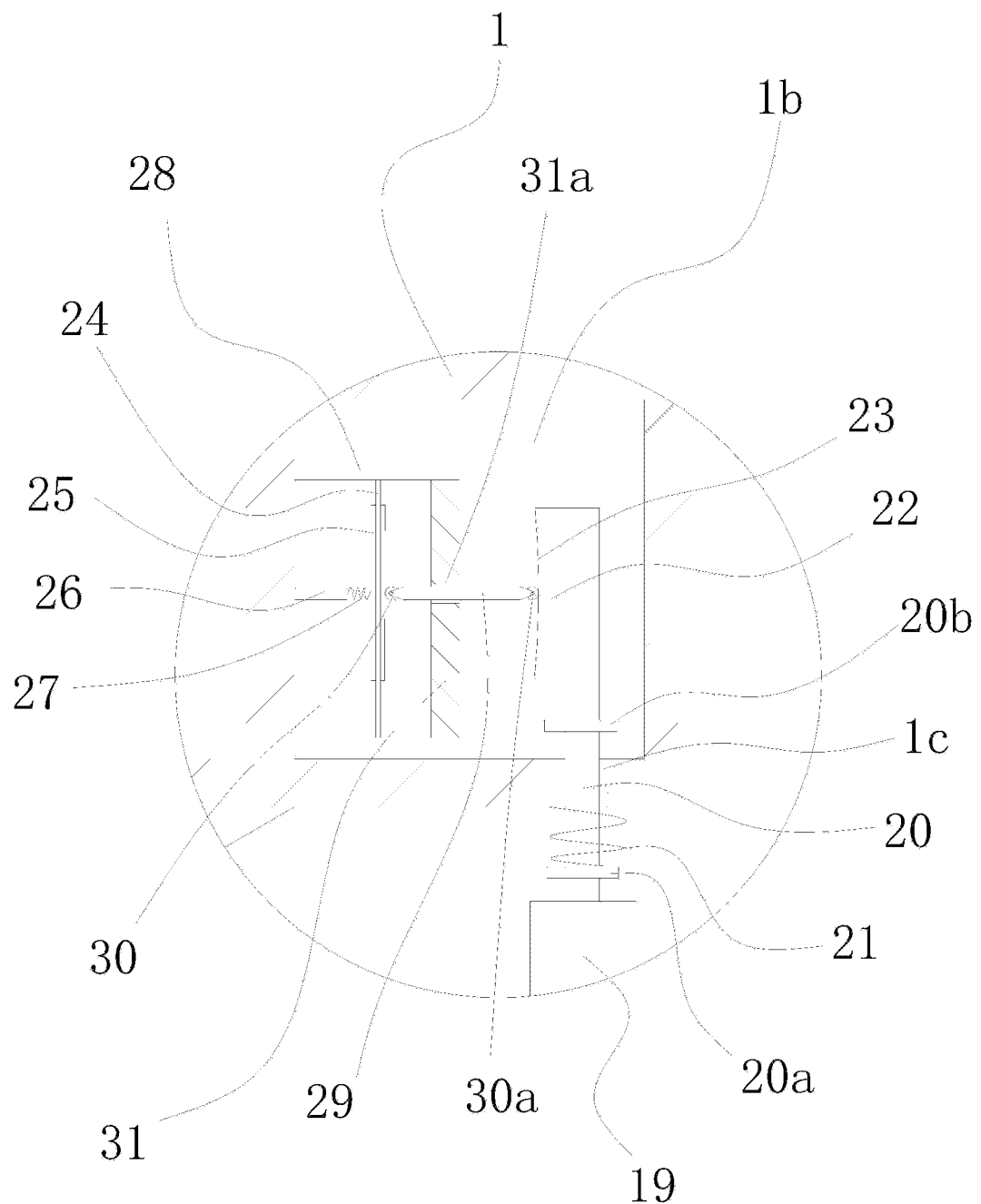
FIG. 2 is an enlarged view of a structure of a position A in FIG. 1 according to an example of the present disclosure.
Figure 3:
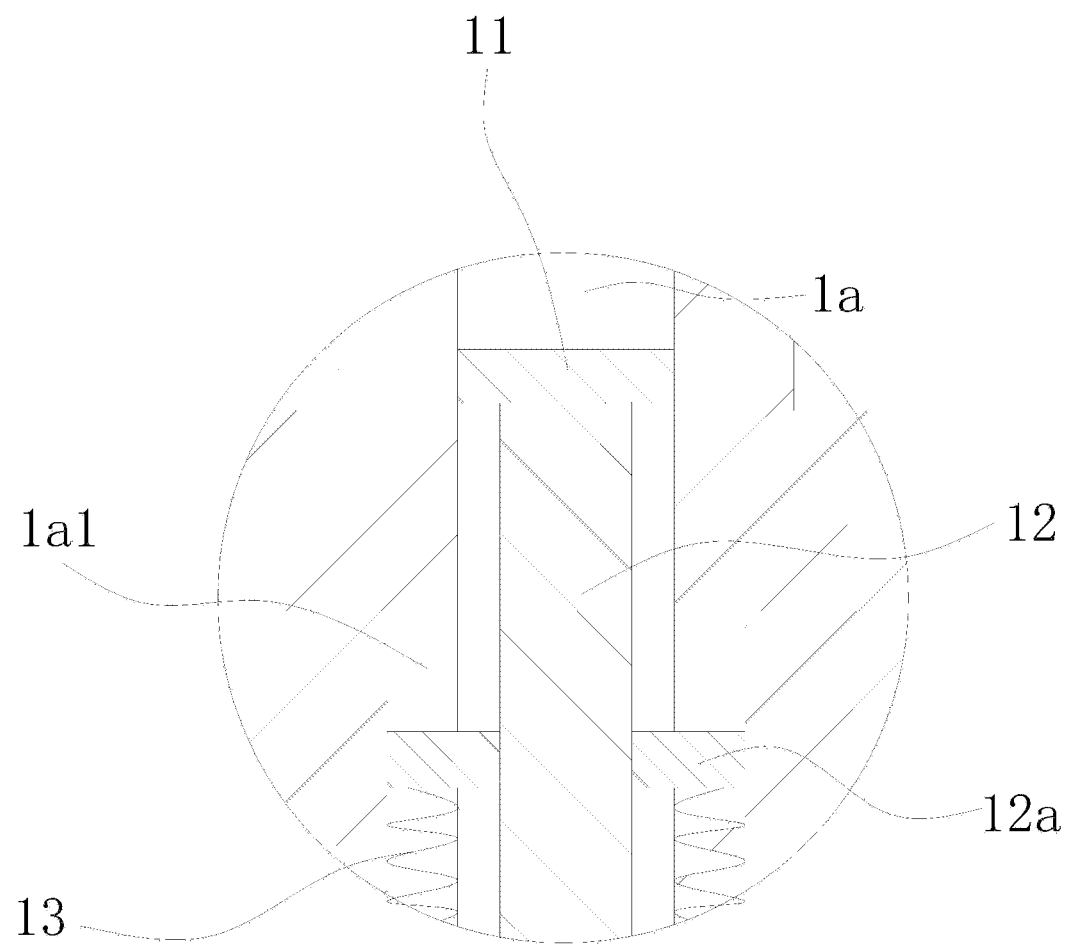
FIG. 3 is an enlarged view of a structure of a position B in FIG. 1 according to an example of the present disclosure.

As shown in FIGS. 1-3, a marine monitoring buoy with an improved structure includes a first cylindrical buoy body 1, where a cylindrical portion 2 and a conical portion 4 are disposed on an upper side surface and a lower side surface of the first buoy body 1 respectively, the cylindrical portion 2 and the conical portion 4 are both coaxially disposed with the first buoy body 1, a vertical through hole 1a is coaxially disposed in the first buoy body 1, a horizontal through hole 2a is disposed in an upper part of the cylindrical portion 2, an upper end of the vertical through hole 1a extends to the cylindrical portion 2 and is in communication with the horizontal through hole 2a, a lower end of the vertical through hole 1a penetrates through the conical portion 4, a wind power generator 10 is disposed at an upper end of the vertical through hole 1a through a first support frame, two guiding grooves 1a1 are oppositely disposed on a side wall of a lower part of the vertical through hole 1a, a metal piston rod 12 is further inserted into the vertical through hole 1a, the metal piston rod 12 is in clearance fit with the vertical through hole 1a, a piston 11 is disposed at an upper end of the metal piston rod 12, sealing is provided between a side wall of the piston 11 and a side wall of the vertical through hole 1a, two sliding blocks 12a are disposed on a side wall of the metal piston rod 12, the sliding blocks 12a are in one-to-one correspondence with the guiding grooves 1a1 and slidably disposed in the corresponding guiding grooves 1a1, a spring 13 is disposed in both of the guiding grooves 1a1, a lower end of the spring 13 is fixed to a lower end of the guiding groove 1a1, an upper end of the spring 13 is fixedly connected on a lower side surface of the sliding block 12a, a fixing ring 12d is disposed at a lower end of the metal piston rod 12, the fixing ring 12d is connected with an anchor 7 through a positioning anchor chain 6, a battery cabin 2b is further disposed inside the upper end of the cylindrical portion 2, a storage battery 8 is disposed in the battery cabin 2b, and the wind power generator 10 is electrically connected with the storage battery 8.

The present marine monitoring buoy is fixed to the sea bottom by the positioning anchor chain 6 and the anchor 7, so that the present marine monitoring buoy can only drift within a range limited by the positioning anchor chain 6.

In a highly windy weather, a conventional marine monitoring buoy will be shaken violently under actions of wave and wind. However, the present marine monitoring buoy is capable of well resisting wind and wave in a weather with large wind and wave. In the weather of large wind and wave, the present marine monitoring buoy will move up and down and swing under the actions of wind and wave. Firstly, during a process that the present marine monitoring buoy moves from a wave trough to a wave crest of the wave, the first buoy body 1, the cylindrical portion 2 and the conical portion 4 all move upward along with the wave crest, and the anchor 7 applies a pulling force to the metal piston rod 12 through the positioning anchor chain 6, so that the metal piston rod 12 slides downward along the vertical through hole 1a by overcoming an elastic force of the spring 13. Therefore, the gravity center of the entire marine monitoring buoy is moved downward, a swing amplitude is reduced, the stability of the present marine monitoring buoy is increased, and a large-wave resistance is improved. During a process that the present marine monitoring buoy moves from the wave crest to the wave trough of the wave, the pulling force applied by the anchor 7 to the metal piston rod 12 through the positioning anchor chain 6 is gradually reduced, so that the metal piston rod 12 slides upward along the vertical through hole 1a under the action of the elastic force of the spring 13, thereby achieving the effect of tightening the anchor chain 6. In this case, the gravity center of the entire marine monitoring buoy is moved upward, and the stability of the present marine monitoring buoy is improved. In addition, the conical portion 4 is disposed on the lower side surface of the first buoy body 1, where the conical portion 4 is in an inverted conical shape. Preferably, the conical portion 4 is a conical counterweight block. The disposal of the conical portion 4 may lower the gravity center of the entire marine monitoring buoy. Therefore, in a poor case of encountering large wind, the present marine monitoring buoy has good resetting performance, which is similar to a tumbler principle.

In addition, since sealing is provided between the piston 11 and an inner wall of the vertical through hole 1a, the vertical through hole 1a is equivalent to a piston cylinder. When the metal piston rod 12 drives the piston 11 to slide downward along the vertical through hole 1a, external air enters the vertical through hole 1a through the horizontal through hole 2a so that the wind power generator 10 is driven to rotate for power generation. When the metal piston rod 12 drives the piston 11 to slide upward along the vertical through hole 1a due to the elastic force of the spring 13, the air located in the vertical through hole 1a is pushed out by the piston 11, so that the air enters an external environment through the horizontal through hole 2a. Further, during this process, the air flow may drive the wind power generator 10 to rotate for power generation. In a case that the stability of the present marine monitoring buoy is improved, the electric energy can also be generated by using the wave energy and then stored in the storage battery 8. The storage battery 8 supplies the electric energy to the electric device mounted on the present marine monitoring buoy.

Specifically, a circular flange 12c is disposed on the side wall of the lower end of the metal piston rod 12, and a rubber layer 12b is disposed at an upper side of the circular flange 12c.

The circular flange 12c serves for limiting, and the rubber layer 12b serves for buffering. Preferably, when the rubber layer 12b is in contact with the conical portion 4, the sliding block 12a on the metal piston rod 12 does not yet reach the upper end of the guiding groove 1a1. A purpose of such design is to avoid a direct collision between the sliding block 12a on the metal piston rod 12 and the upper end of the guiding groove 1a1. Thus, deformation of the sliding block 12a due to the collision is avoided, and otherwise, the up and down slide of the metal piston rod 12 will be affected.

Specifically, the piston 11 always slides between the guiding groove 1a1 and the wind power generator 10 in the vertical through hole 1a.

Specifically, a counterweight block 5 is further disposed between the fixing ring 12d and the positioning anchor chain 6.

The disposal of the counterweight block 5 may further lower the gravity center of the present marine monitoring buoy, so that the present marine monitoring buoy may have a smaller swing amplitude in the environment of large wind and wave. Thus, rapid resetting is realized and the stability of the present marine monitoring buoy is further improved.

Specifically, a mounting platform 3 is further disposed at the upper end of the cylindrical portion 2, a fixing shaft 14 is disposed on the mounting platform 3, a rotary cap 15 is rotatably disposed on the fixing shaft 14, the rotary cap 15 is fixedly connected with a counterweight ring 16 through a support rod 17, the counterweight ring 16 and the fixing shaft 14 are coaxially disposed, and a plurality of blades 18 are uniformly disposed at an outer circumference of the counterweight ring 16.

According to a principle of gyroscopic inertia of a gyro, it can be known that a rotating object has gyroscopic inertia. For example, it is difficult for a rotating gyro and a rolling wheel to fall and they have a characteristic of maintaining an axial direction unchanged, which is referred to as gyroscopic inertia.

When sea wind blows the blade 18, the counterweight ring 16 and the rotary cap 15 are driven to rotate rapidly around the fixing shaft 14. When the counterweight ring 16 and the rotary cap 15 rotate rapidly, the present marine monitoring buoy may maintain relative stability according to the principle of gyroscopic inertia of gyro. In this way, a shaking amplitude and a shaking frequency of the marine monitoring buoy may be reduced. Therefore, damage or abnormal operation of a device mounted on the marine monitoring buoy resulting from excessive shaking amplitude and frequency of the marine monitoring buoy may be avoided.

Further, when wind and wave are larger, a force applied to the blade 18 is larger and rotational speeds of the counterweight ring 16 and the rotary cap 15 are also higher, so that a capability of maintaining the stability of the marine monitoring buoy is increased.

Specifically, a circular cavity 1b is further disposed in the first buoy body 1, the circular cavity 1b and the first buoy body 1 are coaxially disposed, a plurality of power generating apparatuses for generating power by using wave energy are disposed in the circular cavity 1b, and the power generating apparatus and the wind power generator 10 are both electrically connected with the storage battery 8.

The power generating apparatus may generate power by using the wave energy. Since waves always exist in the sea, the power generating apparatus may continuously generate power, thereby ensuring that electric energy is always continuously supplied to the electric device in the marine monitoring buoy.

In addition, a solar panel may also be disposed on the mounting platform 3 of the present marine monitoring buoy, and the solar panel is electrically connected with the storage battery 8. In this way, power is supplied to the storage battery 8 through a plurality of energy sources, thereby ensuring working stability of the present marine monitoring buoy.

Specifically, a plurality of first square guiding holes 1c are disposed at the bottom of the first buoy body 1, the plurality of first square guiding holes 1c are in one-to-one correspondence with a plurality of power generating apparatuses, the first square guiding holes 1c penetrate through the lower side surface of the first buoy body 1 and the circular cavity 1b, the power generating apparatus includes a second buoy body 19, a first movable rod 20 and a second movable rod 29, the first movable rod 20 has a square cross section and is slidably disposed in the first square guiding hole 1c, the second buoy body 19 is disposed at a lower end of the first movable rod 20, a metal plate 24 and a guiding plate 31 are vertically disposed on a side wall of the circular cavity 1b through a second support frame 28, the guiding plate 31 is located between the first movable rod 20 and the metal plate 24, a piezoelectric material layer 25 is disposed at both sides of the metal plate 24, a second square guiding hole 31a is horizontally opened on the guiding plate 31, the second movable rod 29 has a square cross section and is slidably disposed in the second square guiding hole 31a, a first roller 30 and a second roller 30a are rotatably disposed at both ends of the second movable rod 29 respectively, a guiding block 22 is vertically disposed on the first movable rod 20, the guiding block 22 is located in the circular cavity 1b, an arc surface 23 is disposed at a side that is on the guiding block 22 and opposite to the guiding plate 31, the first roller 30 located on the second movable rod 29 is always in contact with the piezoelectric material layer 25 on the metal plate 24, the second roller 30a is always in contact with the arc surface 23, and the piezoelectric material layer 25 is electrically connected with the storage battery 8.

Specifically, the metal plate 24 is made of a memory metal, so that the metal plate 24 may be deformed under the action of an external force and quickly restored to original shape upon disappearance of the external force.

A maximum distance between the first roller 30 and the second roller 30a on the second movable rod 29 is equal to a maximum distance between the arc surface 23 of the guiding block 22 and the piezoelectric material layer 25 at a side that is on the metal plate 24 and opposed to the arc surface 23. That is, when the second roller 30a moves to a point that is on the arc surface 23 and farthest from the metal plate 24, the metal plate 24 just restores to the original shape without deformation.

The cooperation of the first square guiding hole 1c and the first movable rod 20 having a square cross section may prevent the first movable rod 20 from rotating, thereby ensuring that the second roller 30a always rolls on the arc surface 23.

In a case of a wave crest, the wave acts on the second buoy body 19 by applying an upward pushing force to the second buoy body 19, the first movable rod 20 moves upward, and the second movable rod 29 moves leftward under the action of the arc surface 23. Under the action of the second movable rod 29, the metal plate 24 and the piezoelectric material layer 25 are deformed, and the piezoelectric material layer 25 generates the electric energy.

In a case of wave trough, the force applied by the wave to the second buoy body 19 disappears, and gravities of the first movable rod 20 and the second buoy body 19 cause the first movable rod 20 to move downward. Under the action of a restoring force of the metal plate 24, the second movable rod 29 is moved rightward, and the metal plate 24 gradually restores to the original shape.

Under the actions of the next wave crest and wave trough, the metal plate 24 and the piezoelectric material layer 25 repeat the above states, i.e., the metal plate 24 and the piezoelectric material layer 25 are continuously deformed and then restored, thereby continuously generating the electric energy. The above electric energy is stored in the storage battery 8 and used for the electric device in the marine monitoring buoy.

Specifically, an upper limiting ring 20b and a lower limiting ring 20a are further disposed on the first movable rod 20, sizes of the upper limiting ring 20b and the lower limiting ring 20a are both larger than that of the first square guiding hole 1c and the upper limiting ring 20b and the lower limiting ring 20a are located at upper and lower sides of the first square guiding hole 1c respectively, the power generating apparatus further includes a resetting spring 21, the reset spring 21 is sleeved on the first movable rod 20, an upper end of the resetting spring 21 is pressed against the lower side surface of the first buoy body 1, and a lower end of the resetting spring 21 is pressed against the lower limiting ring 20a.

The upper limiting ring 20b and the lower limiting ring 20a serves to limit a stroke of the first movable rod 20 so that separation of the second roller 30a on the second movable rod 29 from the arc surface 23 of the guiding block 22 due to the excessive stroke of the first movable rod 20 is avoided.

The resetting spring 21 achieves a buffering effect, so that the first movable rod 20 moves up and down more stably. Further, the resetting spring 21 may also provide a restoring force to the second movable rod 29. That is, in a case of a wave crest, the wave acts on the second buoy body 19 by applying an upward pushing force to the second buoy body 19, and the first movable rod 20 moves upward. In a case of a wave trough, the force applied by the wave to the second buoy body 19 disappears, and the first movable rod may rapidly reset downward under the action of the resetting spring 21, thereby improving a working efficiency.

Specifically, the power generating apparatus further includes a limiting column 26, the limiting column 26 is horizontally disposed on the side wall of the circular cavity 1b, an end of the limiting column 26 and an end of the second movable rod 29 are oppositely disposed, the limiting column 26 and the second movable rod 29 are located at both sides of the metal plate 24 respectively, and a buffering spring 27 is disposed between the limiting column 26 and the piezoelectric material layer 25 on the metal plate 24.

The limiting column 26 serves to control a maximum deformation amount of the metal plate 24, so that metal plate 24 may restore to the original shape after deformation. A case that the metal plate 24 cannot restore to the original shape due to excessive deformation, affecting the normal operation of the power generating apparatus is avoided.

The buffering spring 27 achieves a buffering effect, so that the metal plate 24 may work more stably under the action of the second movable rod 29, thereby improving reliability of the power generating apparatus.

Specifically, a plurality of warning lights 9 are disposed on the mounting platform 3, and the warning light 9 is electrically connected with the storage battery 8.

The warning light 9 may emit light around the marine monitoring buoy to provide a warning to passing ships so that a collision between the ship and the marine monitoring buoy may be avoided, thereby protecting the marine monitoring buoy.

Specifically, the piezoelectric material layer 25 is made of piezoelectric ceramic or piezoelectric crystal, and preferably is made of the piezoelectric crystal.

Persons skilled in the art may make various modifications, supplementations or substitutions of the similar nature to the described specific examples without departing from the spirit of the present disclosure or surpassing the scope defined by the appended claims.

We claim:

1. A marine monitoring buoy with an improved structure, comprising a first cylindrical buoy body (1), wherein a cylindrical portion (2) and a conical portion (4) are disposed on an upper side surface and a lower side surface of the first buoy body (1) respectively, the cylindrical portion (2) and the conical portion (4) are both coaxially disposed with the first buoy body (1), a vertical through hole (1a) is coaxially disposed in the first buoy body (1), a horizontal through hole (2a) is disposed in an upper part of the cylindrical portion (2), an upper end of the vertical through hole (1a) extends to the cylindrical portion (2) and is in communication with the horizontal through hole (2a), a lower end of the vertical through hole (1a) penetrates through the conical portion (4), a wind power generator (10) is disposed at an upper end of the vertical through hole (1a) through a first support frame (10a), two guiding grooves (1a1) are oppositely disposed on a side wall of a lower part of the vertical through hole (1a), a metal piston rod (12) is further inserted into the vertical through hole (1a), the metal piston rod (12) is in clearance fit with the vertical through hole (1a), a piston (11) is disposed at an upper end of the metal piston rod (12), sealing is provided between a side wall of the piston (11) and a side wall of the vertical through hole (1a), two sliding blocks (12a) are disposed on a side wall of the metal piston rod (12), the sliding blocks (12a) are in one-to-one correspondence with the guiding grooves (1a1) and slidably disposed in the corresponding guiding grooves (1a1), a spring (13) is disposed in both of the guiding grooves (1a1), a lower end of the spring (13) is fixed to a lower end of the guiding groove (1a1), an upper end of the spring (13) is fixedly connected on a lower side surface of the sliding block (12a), a fixing ring (12d) is disposed at a lower end of the metal piston rod (12), the fixing ring (12d) is connected with an anchor (7) through a positioning anchor chain (6), a battery cabin (2b) is further disposed inside the upper end of the cylindrical portion (2), a storage battery (8) is disposed in the battery cabin (2b), and the wind power generator (10) is electrically connected with the storage battery (8).

2. The marine monitoring buoy with an improved structure according to claim 1, wherein a circular flange (12c) is disposed on the side wall of the lower end of the metal piston rod (12), and a rubber layer (12b) is disposed at an upper side of the circular flange (12c).

3. The marine monitoring buoy with an improved structure according to claim 2, wherein a counterweight block (5) is further disposed between the fixing ring (12d) and the positioning anchor chain (6).

4. The marine monitoring buoy with an improved structure according to claim 1, wherein a mounting platform (3) is further disposed at the upper end of the cylindrical portion (2), a fixing shaft (14) is disposed on the mounting platform (3), a rotary cap (15) is rotatably disposed on the fixing shaft (14), the rotary cap (15) is fixedly connected with a counterweight ring (16) through a support rod (17), the counterweight ring (16) and the fixing shaft (14) are coaxially disposed, and a plurality of blades (18) are uniformly disposed at an outer circumference of the counterweight ring (16).

5. The marine monitoring buoy with an improved structure according to claim 4, wherein a circular cavity (1b) is further disposed in the first buoy body (1), the circular cavity (1b) and the first buoy body (1) are coaxially disposed, a plurality of power generating apparatuses for generating power by using wave energy are disposed in the circular cavity (1b), and the power generating apparatus is electrically connected with the storage battery (8).

6. The marine monitoring buoy with an improved structure according to claim 5, wherein a plurality of first square guiding holes (1c) are disposed at the bottom of the first buoy body (1), the plurality of first square guiding holes (1c) are in one-to-one correspondence with a plurality of power generating apparatuses, the first square guiding holes (1c) penetrate through the lower side surface of the first buoy body (1) and the circular cavity (1b), the power generating apparatus comprises a second buoy body (19), a first movable rod (20) and a second movable rod (29), the first movable rod (20) has a square cross section and is slidably disposed in the first square guiding hole (1c), the second buoy body (19) is disposed at a lower end of the first movable rod (20), a metal plate (24) and a guiding plate (31) are vertically disposed on a side wall of the circular cavity (1b) through a second support frame (28), the guiding plate (31) is located between the first movable rod (20) and the metal plate (24), a piezoelectric material layer (25) is disposed at both sides of the metal plate (24), a second square guiding hole (31a) is horizontally opened on the guiding plate (31), the second movable rod (29) has a square cross section and is slidably disposed in the second square guiding hole (31a), a first roller (30) and a second roller (30a) are rotatably disposed at both ends of the second movable rod (29) respectively, a guiding block (22) is vertically disposed on the first movable rod (20), the guiding block (22) is located in the circular cavity (1b), an arc surface (23) is disposed at a side that is on the guiding block (22) and opposed to the guiding plate (31), the first roller (30) located on the second movable rod (29) is always in contact with the piezoelectric material layer (25) on the metal plate (24), the second roller (30a) is always in contact with the arc surface (23), and the piezoelectric material layer (25) is electrically connected with the storage battery (8).

7. The marine monitoring buoy with an improved structure according to claim 6, wherein an upper limiting ring (20b) and a lower limiting ring (20a) are further disposed on the first movable rod (20), sizes of the upper limiting ring (20b) and the lower limiting ring (20a) are both larger than that of the first square guiding hole (1c) and the upper limiting ring (20b) and the lower limiting ring (20a) are located at upper and lower sides of the first square guiding hole (1c) respectively, the power generating apparatus further comprises a resetting spring (21), the resetting spring (21) is sleeved on the first movable rod (20), an upper end of the resetting spring (21) is pressed against the lower side surface of the first buoy body (1), and a lower end of the resetting spring (21) is pressed against the lower limiting ring (20a).

8. The marine monitoring buoy with an improved structure according to claim 7, wherein the power generating apparatus further comprises a limiting column (26), the limiting column (26) is horizontally disposed on the side wall of the circular cavity (1b), an end of the limiting column (26) and an end of the second movable rod (29) are oppositely disposed, the limiting column (26) and the second movable rod (29) are located at both sides of the metal plate (24) respectively, and a buffering spring (27) is disposed between the limiting column (26) and the piezoelectric material layer (25) on the metal plate (24).

* * * * *